United States Patent [19]
Chae

[11] Patent Number: 5,762,303
[45] Date of Patent: Jun. 9, 1998

[54] TILTING ANGLE ADJUSTING DEVICE FOR USE IN A PROJECTOR

[75] Inventor: Song Chae, Seoul, Rep. of Korea

[73] Assignee: Daewoo Electronics Co., Ltd., Seoul, Rep. of Korea

[21] Appl. No.: 546,801

[22] Filed: Oct. 23, 1995

[30] Foreign Application Priority Data

Oct. 31, 1994 [KR] Rep. of Korea ............... 94-28731

[51] Int. Cl.[6] ........................................ F16M 11/24
[52] U.S. Cl. ........................... 248/188.4; 248/649
[58] Field of Search ...................... 248/188.4, 188, 248/188.1, 188.2, 188.3, 188.8, 649, 650, 151, 685, 688, 677, 624

[56] References Cited

U.S. PATENT DOCUMENTS

| | | | |
|---|---|---|---|
| 2,302,134 | 11/1942 | McNabb | 248/649 |
| 2,742,307 | 4/1956 | Elsner | 248/188 |
| 3,100,099 | 8/1963 | Schaefer | 248/188.4 |
| 3,131,505 | 5/1964 | Cruikshank | 248/188.4 |
| 3,575,288 | 4/1971 | Bracken | 248/188.4 |
| 3,938,798 | 2/1976 | Solie et al. | 248/411 |

*Primary Examiner*—Leslie A. Braun
*Assistant Examiner*—Anita M. King
*Attorney, Agent, or Firm*—Anderson, Kill & Olick, P.C.

[57] ABSTRACT

The tilting angle adjusting device comprises a leg provided with a supporting portion, a guide portion with a guide groove and a supporting shaft a plurality of supporting grooves; an adjusting member including a lug and a supporting piece; and a first and a second compressive springs. In such a projector incorporating therein the inventive tilting angle adjusting device, the tilting angle is adjusted by the flanking prongs of the supporting piece of the adjusting member on the supporting grooves.

11 Claims, 5 Drawing Sheets

5,762,303

TILTING ANGLE ADJUSTING DEVICE FOR USE IN A PROJECTOR

FIELD OF THE INVENTION

The present invention relates to a projector; and, more particularly, to a device for adjusting a tilting angle of the projector with ease.

DESCRIPTION OF THE PRIOR ART

As shown in FIG. 1, a projector normally includes one or more (only one is shown) tilting angle adjusting devices 10 for adjusting a tilting angle thereof. The tilting angle adjusting devices 10 are located at a bottom portion 1 of the projector, usually one tilting angle adjusting device 10 for each corner of the bottom portion 1.

Each of the tilting angle adjusting devices 10 includes an adjusting member 2 having a top and a bottom surfaces 3, 4, a threaded shaft 2a extending upward from the top surface 3 of the adjusting member 2, and a supporting member 6 extending downward from the bottom surface 4 of the adjusting member 2 and having a bottom surface 6', wherein the threaded shaft 2a is fitted into a matching blind tapped hole 1a formed at the bottom portion 1 of the projector.

The adjusting member 2, the threaded shaft 2a and the supporting member 6 are integrally joined together to allow an integral movement thereof.

The tilting angle of the projector is adjusted by rotating clockwise or counterclockwise the adjusting member 2 in each of the tilting angle adjusting devices 10, resulting in a corresponding rotation of the threaded shaft 2a fitted in the blind tapped hole 1a and forcing the projector to move upward or downward.

However, it is difficult to rotate the adjusting member 2 due to a friction between the bottom surface 6' of the supporting member 6 and a plane 5 on which the projector is set, said friction being linked to the fact that the full weight of the projector is being thrust upon the tilting angle adjusting device 10.

SUMMARY OF THE INVENTION

It is, therefore, a primary object of the present invention to provide a tilting angle adjusting device for adjusting a tilting angle of a projector with an improved ease.

In accordance with one aspect of the present invention, there is provided a tilting angle adjusting device for use in a projector, the projector including a panel having an inner wall with a concavity formed thereon and a bottom portion provided with an opening and a stepped concavity with a desired depth formed thereon, the stepped concavity further having a slot and a stepped portion, the tilting angle adjusting device comprising: a leg provided with a supporting portion having a round bottom surface, a guide portion with a guide groove and a supporting shaft protruding upward along the guide groove and having a plurality of circumferential supporting grooves, each of the grooves being spaced apart at a regular interval; an adjusting member including a lug having an end slidably mounted into the concavity of the panel and a supporting piece having an end provided with a pair of flanking prongs passing through the slot on the stepped concavity and being optionally inserted into one of the supporting grooves; and a first and a second compressive springs, wherein the first compressive spring is provided in the guide groove of the guide portion and is interposed between the stepped portion of the stepped concavity and the supporting portion of the leg, thereby pressing the projector upward, and the second compressive spring is provided into the concavity of the panel, thereby pressing one end of the lug toward the leg.

In accordance with another aspect of the present invention, there is provided a tilting angle adjusting device for use in a projector, the projector including a panel having an inner wall with a pair of concavities formed thereon and a bottom portion provided with an opening and a pair of stepped concavities with a desired depth formed on the bottom portion, each of the stepped concavities further having a slot and a stepped portion, the tilting angle adjusting device comprising: a pair of legs, each of the legs provided with a supporting portion having a round bottom surface, a guide portion with a guide groove and a supporting shaft protruding upward from the supporting portion along the guide groove and having a plurality of circumferential supporting grooves, each of the grooves being spaced apart at a regular interval; an adjusting member including a lug and a unitary supporting piece provided with a connecting portion and a pair of supporting plates, each of the supporting plates having two ends, one end having a contact member attached thereto and slidably mounted into the corresponding concavity of the panel, and the other end having a pair of flanking prongs passing through the slot on the corresponding stepped concavity and being optionally inserted into one of the supporting grooves; and a pair of first compressive springs and a pair of second compressive springs, wherein each of the first compressive springs is provided in the guide groove of the corresponding guide portion and is interposed between the stepped portion of the corresponding stepped concavity and the supporting portion of the corresponding leg, thereby pressing the projector upward, and each of the second compressive springs is provided into the corresponding concavity of the panel, thereby pressing the corresponding contact member toward the corresponding leg.

BRIEF DESCRIPTION OF THE DRAWING

The above and other objects and features of the present invention will become apparent from the following description of preferred embodiments when taken in conjunction with the accompanying drawings, in which.

DETAILED DESCRIPTION OF THE PREFERRED EMBODIMENTS

Figure 1:
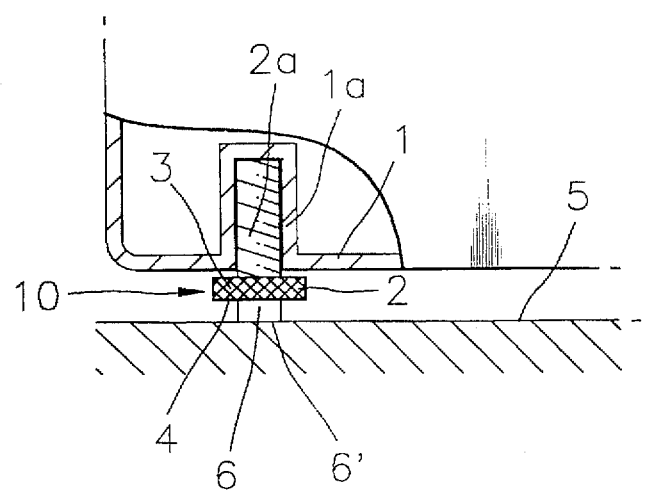
FIG. 1 presents a partial cross-sectional view of a projector incorporating therein a conventional tilting angle adjusting device.
Figure 2:
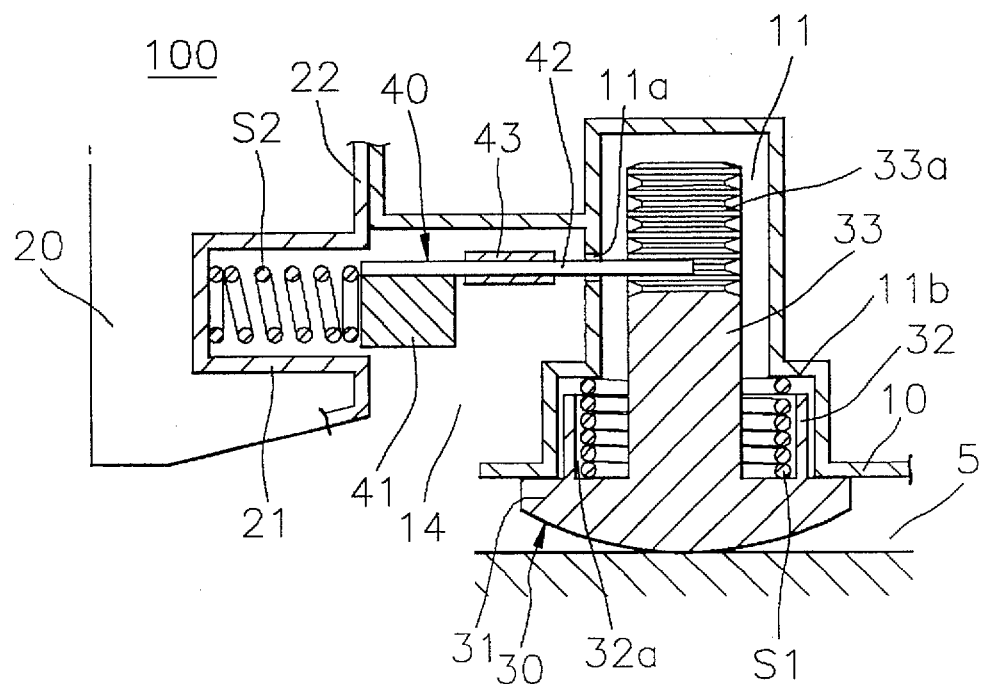
FIG. 2 depicts a partial cross-sectional view of a projector incorporating therein an inventive tilting angle adjusting device in accordance with a preferred embodiment of the present invention.
Figure 3:
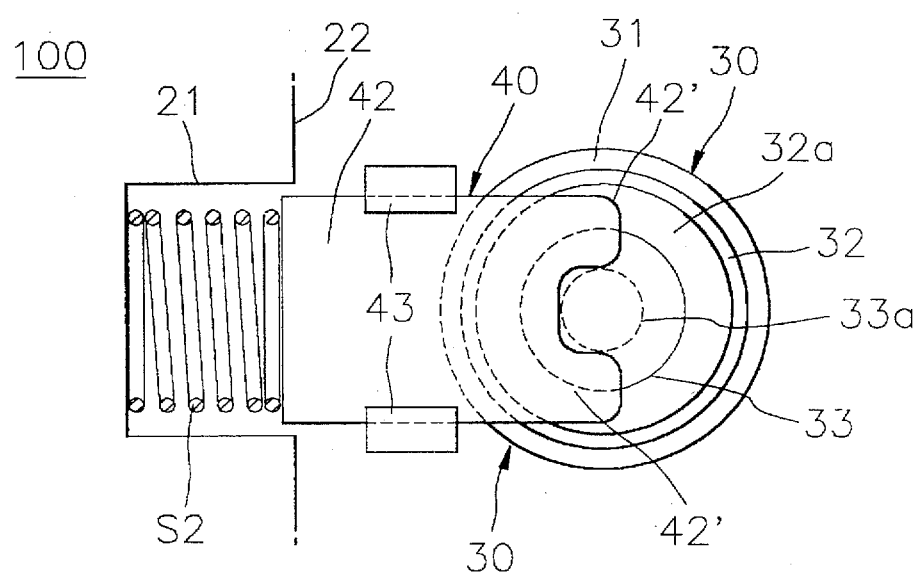
FIG. 3 shows a schematic top view of the inventive tilting angle adjusting device shown in FIG. 2.

There is shown in FIG. 2 a partial cross-sectional view of a projector incorporating therein an inventive tilting angle adjusting device 100 in accordance with a preferred embodiment of the present invention.

The projector includes a panel 20 having an inner wall 22 with a concavity 21 formed thereon and a bottom portion 10 provided with an opening 14 and a stepped concavity 11 with a desired depth, the stepped concavity 11 having a slot 11a and a stepped portion 11b.

The tilting angle adjusting device 100 for adjusting a tilting angle of the projector comprises a leg 30, an adjusting member 40 and a first and a second compressive springs S1 and S2.

The leg 30 is provided with a supporting portion 31 having a round bottom surface, a guide portion 32 with a guide groove 32a and a supporting shaft 33. The supporting shaft 33 protrudes upward from the supporting portion 31 along the guide groove 32a and has a plurality of circumferential supporting grooves 33a, each of the grooves being spaced apart at a regular interval.

The adjusting member 40 includes a lug 41 having an end slidably mounted into the concavity 21 of the panel 20 and a supporting piece 42 having an end provided with a pair of flanking prongs 42' passing through the slot 11a on the stepped concavity 11 and being optionally inserted into one of the supporting grooves 33a.

It is preferable that the adjusting member 40 further include a pair of guide plates 43 for guiding the movement of the supporting piece 42. The pair of guide plates 43 may be fixed to the bottom portion 10 through an appropriate fastening means, e.g., a screw.

The first compressive spring S1 is provided in the guide groove 32a of the guide portion 32 and is interposed between the stepped portion 11b of the stepped concavity 11 and the supporting portion 31, thereby pressing the projector upward.

Furthermore, the second compressive spring S2 is provided into the concavity 21, thereby pressing the end of the lug 41 toward the leg 30.

The operation of the tilting angle adjusting device 100 will now be described using FIGS. 4A and 4B.

Figure 4A:
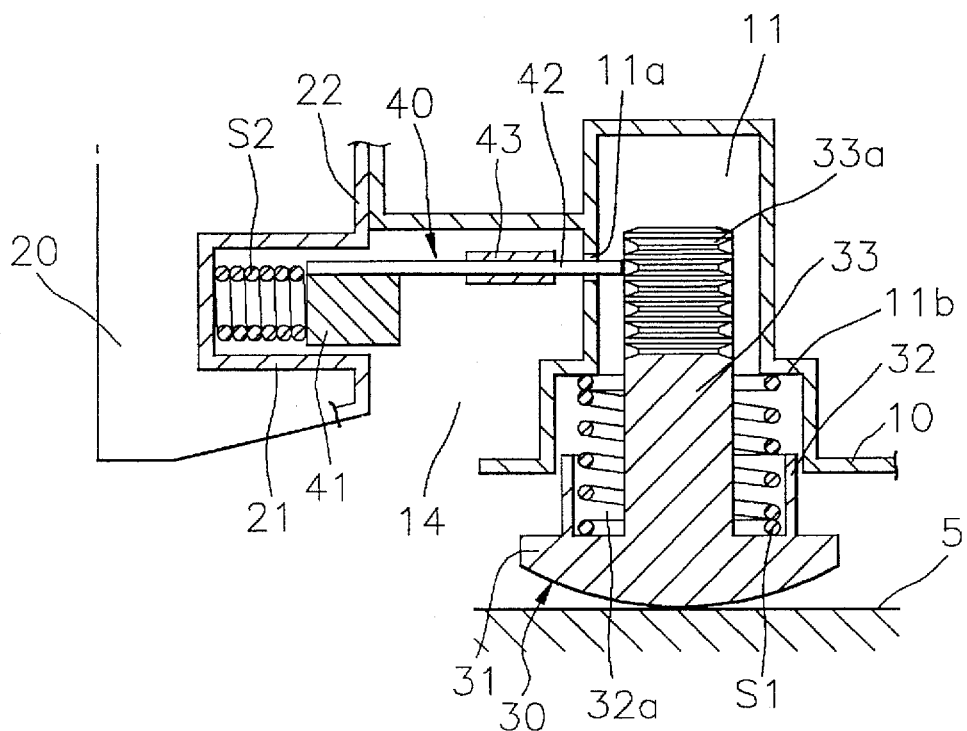
FIGS. 4A and 4B illustrate the operation of the inventive tilting angle adjusting device shown in FIG. 2.

As shown in FIG. 4A, when an operator moves the adjusting member 40 toward the panel 20 by forcing manually the lug 41 through the opening 14, the flanking prongs 42' of the supporting piece 42 inserted into one of the supporting grooves 33a free themselves from the supporting groove 33a, allowing the projector to move upward by means of the compressive force of the first compressive spring S1.

Figure 4B:
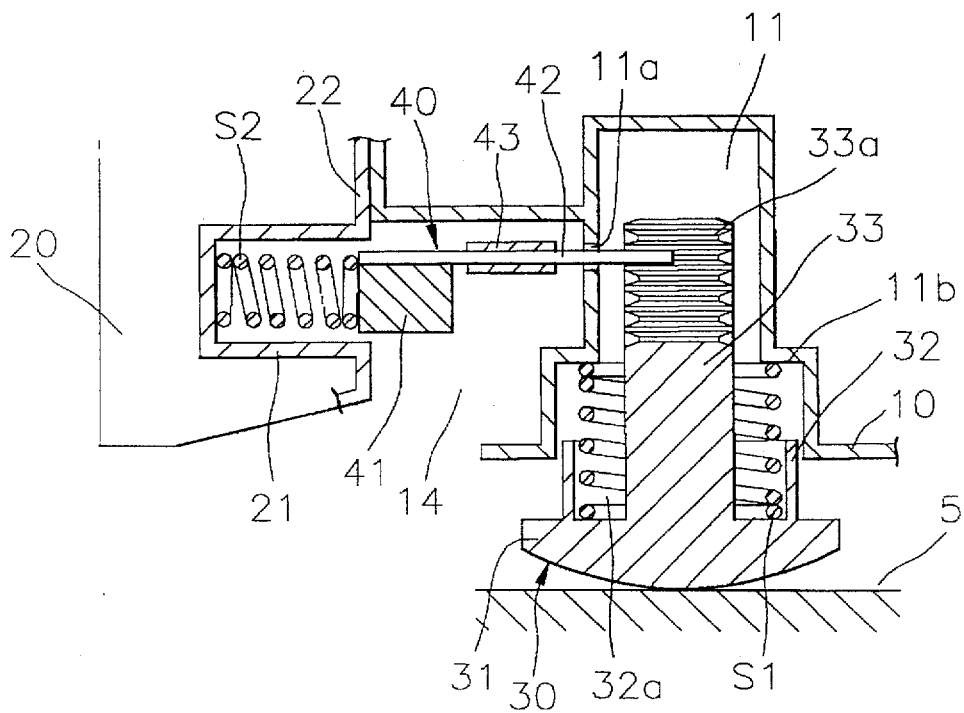

As shown in FIG. 4B, when the projector comes to a desired tilting angle, the adjusting member 40 is restored to an initial position by means of the compressive force of the second compressive spring S2 and the flanking prongs 42' of the supporting piece 42 are again inserted into another supporting groove 33a.

In such a projector incorporating therein the inventive tilting angle adjusting device 100, the tilting angle is adjusted by the flanking prongs 42' of the supporting piece 42 of the adjusting member 40 on the supporting grooves 33a. Adjusting of the tilting angle using the inventive tilting angle adjusting device 100 is achieved with a greater simplicity and ease than that of the prior art, since the former does not involve the rotation of the adjusting member while supporting the weight of the projector, unlike the prior art device.

Figure 5:
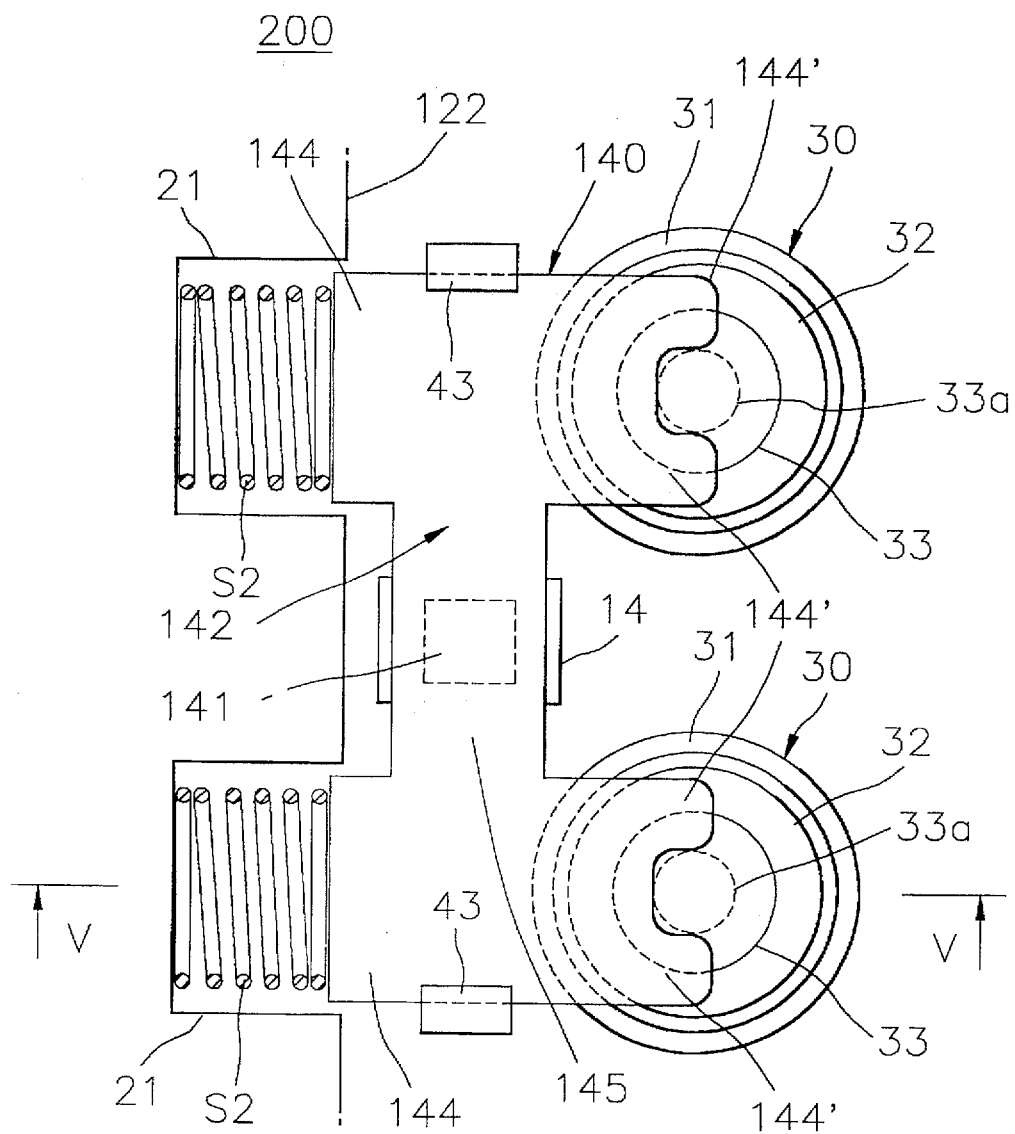
FIG. 5 offers a schematic top view of a tilting angle adjusting device in accordance with another preferred embodiment of the present invention.

There is shown in FIG. 5 a schematic top view of an inventive tilting angle adjusting device 200 in accordance with another preferred embodiment of the present invention.

The second embodiment is similar to the first embodiment except that the leg 30, the first and the second compressive springs S1 and S2 are provided in a pair, respectively, and the adjusting member 140 is provided with a unitary supporting piece 142. Therefore, the explanation of the same components as in the first embodiment is omitted herein.

The projector includes a panel 120 having an inner wall 122 with a pair of concavities 21 formed thereon and a bottom portion 10 provided with an opening 14 and a pair of stepped concavities 11 with a desired depth, each of the stepped concavities 11 having a slot 11a and a stepped portion 11b.

The tilting angle adjusting device 200 comprises a pair of legs 30, a pair of first compressive springs S1 and a pair of second compressive springs S2 and an adjusting member 140.

The adjusting member 140 is provided with a first lug 141 and a unitary supporting piece 142 having a pair of supporting plates 144 and a connecting portion 145. The first lug 141 is located at or near the center of the connecting portion 145 of the unitary supporting piece 142.

It is preferable that the adjusting member 140 further include a pair of guide plates 43 for guiding the movement of the unitary supporting piece 142. The pair of guide plates 43 may be fixed to the bottom portion 10 through an appropriate fastening means, e.g., a screw.

Figure 6:
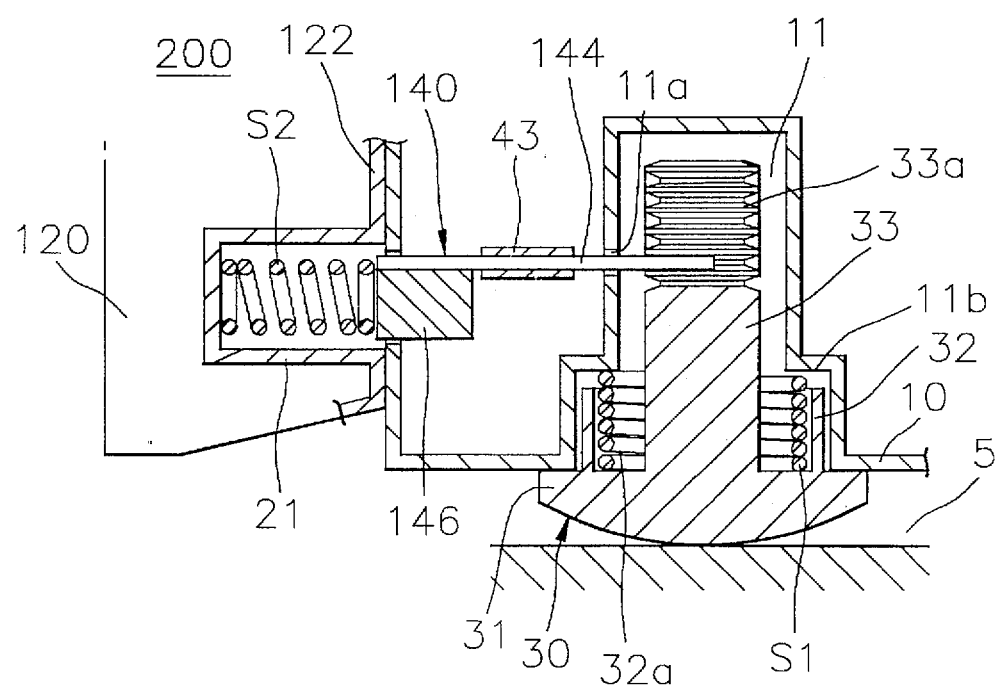
FIG. 6 provides a cross sectional view taken along a line V—V of FIG. 5.

Each of the supporting plates 144 has two ends, one end having a second lug 146 which is attached thereto and slidably mounted into the corresponding concavity 21 in the panel 120 (see FIG. 6) and the other end having a pair of flanking prongs 144' passing through the slot 11a of the corresponding stepped concavity 11 and being optionally inserted into the supporting grooves 33a of the corresponding leg 30.

Each of the first compressive springs S1 is provided in the guide groove 32a of the corresponding guide portion 32 and is interposed between the stepped portion 11b of the corresponding stepped concavity 11 and the supporting portion 31 of the corresponding leg 30, thereby pressing the projector upward.

Furthermore, each of the second compressive springs S2 is provided into the corresponding concavity 21 of the panel 120, thereby pressing the corresponding second lug 146 toward the corresponding leg 30.

The operation of the second embodiment is also similar to the first embodiment.

When an operator moves the adjusting member 140 toward the panel 120 by forcing manually the first lug 141 through the opening 14, the pair of flanking prongs 144' of each of the supporting plates 144 inserted into one of the supporting grooves 33a of the corresponding leg 30 free themselves from the supporting groove 33a, allowing the projector to move upward by means of the compressive forces of the first compressive springs S1.

When the projector comes to a desired tilting angle, the adjusting member 140 is restored to its initial position by means of the compressive forces of the second compressive springs S2 and the flanking prongs 144' of each of the supporting plates 144 are inserted simultaneously into another supporting groove 33a of the corresponding leg 30 again.

Such a projector incorporating therein the inventive adjusting device 200 in accordance with the second preferred embodiment of the present invention, in addition to the above mentioned advantages of the first embodiment, has another advantage in that, since the two pairs of flanking prongs 144' of the supporting plates 144 are all simultaneously released from and are inserted into the supporting grooves 33a of the corresponding legs 30, it is easier to keep the projector from tilting in a lateral direction in comparison with the projector incorporating therein two tilting angle adjusting devices 100 in accordance with the first preferred embodiment of the present invention.

In the above preferred embodiments, it does not matter whether the panel of the projector is located front or rear thereof.

Although the invention has been shown and described with respect to the preferred embodiments, it will be understood by those skilled in the art that various changes and modifications may be made without departing from the spirit and scope of the invention as defined in the following claims.

What is claimed is:

1. A tilting angle adjusting device for use in a projector, the projector having a panel having an inner wall with a concavity formed thereon and a bottom portion provided with an opening and a stepped concavity formed on the bottom portion, the stepped concavity having a slot and a stepped portion, the tilting angle adjusting device comprising:
    a leg having a supporting portion with a supporting shaft protruding upwardly from thereon, the supporting shaft having a plurality of circumferential supporting grooves;
    an adjusting member provided with a supporting piece having two ends, said supporting piece having at one end a lug slidably mounted in the concavity of the panel for attachment to the projector and at the other end a pair of flanking prongs for passing through the slot on the stepped concavity and being optionally inserted into one of the supporting grooves for setting the tilting angle of the projector;
    a first compressive spring provided around the supporting shaft on the supporting portion for biasing the projector upwardly; and
    a second compressive spring positionable in the concavity of the panel of the projector for biasing the lug toward the leg to insert the flanking prongs into one of the supporting grooves to prevent the projector from moving upwardly.

2. The device of claim 1, wherein the adjusting member further includes a pair of guide plates for guiding the movement of the supporting piece.

3. The device of claim 1, wherein the circumferential grooves of the supporting shaft are spaced apart at a regular interval.

4. The device of claim 1, wherein the supporting portion has a round bottom surface.

5. The device of claim 1, further comprising a guide portion disposed around the supporting shaft; and wherein the first compressive spring is disposed between the supporting shaft and the guide portion.

6. A tilting angle adjusting device for use in a projector, the projector having a panel having an inner wall with a pair of concavities formed thereon and a bottom portion provided with an opening and a pair of stepped concavities formed on the bottom portion, each of the stepped concavities having a slot and a stepped portion, the tilting angle adjusting device comprising:
    a pair of legs, each of the legs provided with a supporting portion having a bottom surface, a guide portion and a supporting shaft protruding upward from the supporting portion, the supporting shaft having a plurality of circumferential supporting grooves;
    an adjusting member provided with a unitary supporting piece having a pair of supporting plates connected by a connection portion and a first lug protruding downwardly from the connection portion, each of the supporting plates having at one end a second lug slidably mounted in the corresponding concavity of the panel for attachment to the projector and at the other end a pair of flanking prongs for passing through the slot on the corresponding stepped concavity and being optionally inserted in one of the supporting grooves for setting the tilting angle of the projector;
    a pair of first compressive springs provided around the supporting shaft on the supporting guide portions, respectively, for biasing the projector upwardly; and
    a pair of second compressive springs positionable in the corresponding concavities of the panel of the projector for biasing the second lug toward the legs to insert the flanking prongs into one of the supporting grooves to prevent the projector from moving upwardly.

7. The projector of claim 6, wherein the adjusting member further includes a pair of guide plates for guiding the movement of the supporting piece.

8. The projector of claim 6, wherein the circumferential grooves of the supporting shafts are spaced apart at a regular interval.

9. The projector of claim 6, wherein each of the supporting portions have a round bottom surface.

10. The projector of claim 6, further comprising guide portions disposed around the respective supporting shaft; and wherein each of the first compressive springs is disposed between a respective supporting shaft and a respective guide portion.

11. A tilting angle adjusting device for use in a projector, the projector having a panel having an inner wall with a concavity formed thereon and a bottom portion provided with an opening and a stepped concavity formed on the bottom portion, the stepped concavity having a slot and a stepped portion, the tilting angle adjusting device comprising:
    a leg provided with a supporting portion having a round bottom surface, a guide portion with a guide groove and a supporting shaft protruding upwardly from the supporting portion along the guide groove having a plurality of circumferential supporting grooves, each of the grooves being spaced apart at a regular interval;
    an adjusting member including a supporting piece provided at one end with a pair of flanking prongs for passing through the slot on the stepped concavity and being optionally inserted into one of the supporting grooves for setting the tilting angle of the projector, and a lug fixed at the other end of the supporting piece, the lug being slidably mounted into the concavity of the panel for attachment to the projector;
    a first compressive spring for biasing the projector upwardly, wherein the first compressive spring is provided in the guide groove of the guide portion and interposed between the stepped portion of the stepped concavity and the supporting portion of the leg; and
    a second compressing spring is positionable in the concavity of the panel of the projector for biasing the lug toward the leg to insert the flanking prongs into one of the supporting grooves to prevent the projector from moving upwardly.

* * * * *